Patented May 6, 1930

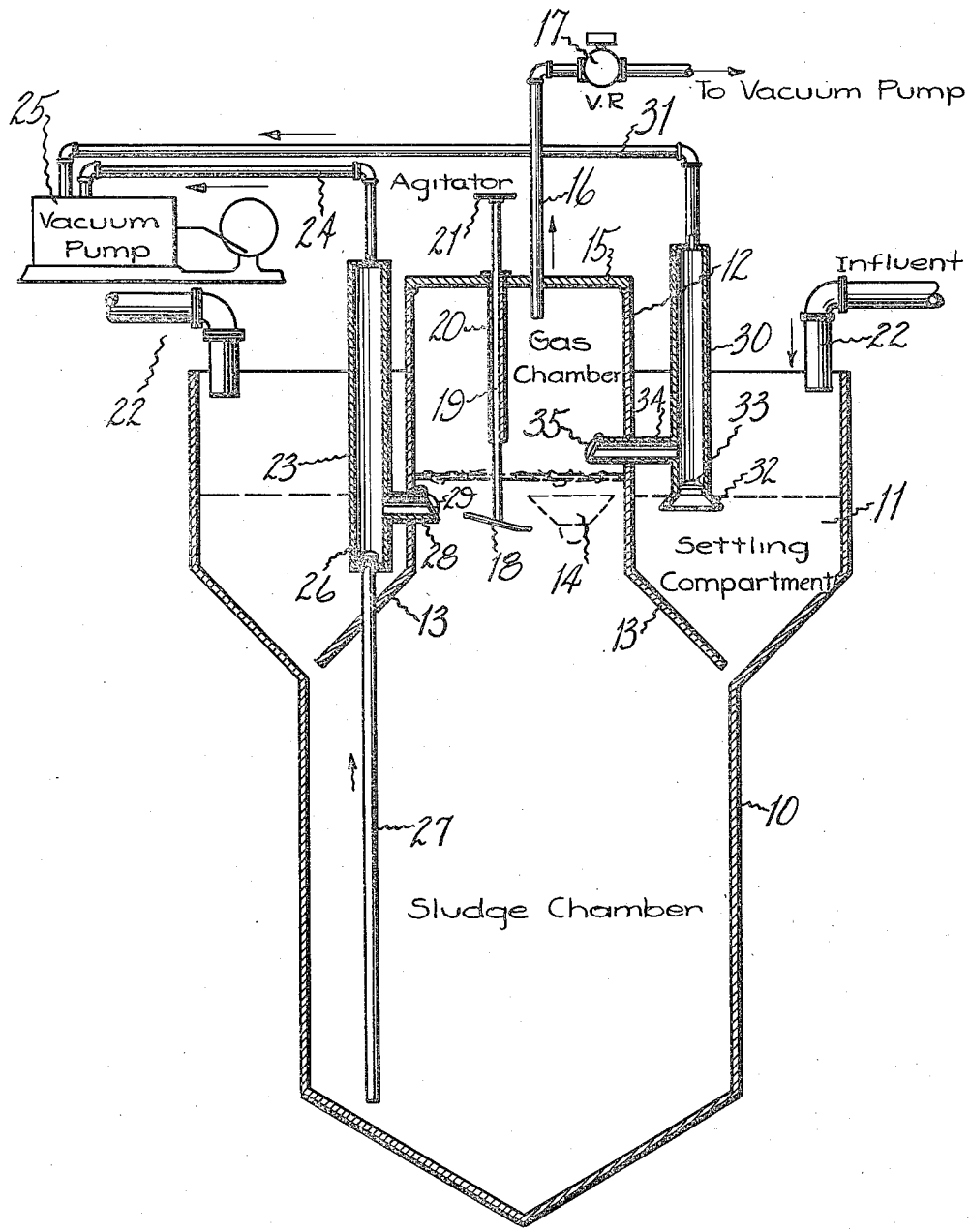

1,757,263

UNITED STATES PATENT OFFICE

THOMAS B. SIMS, OF CLEBURNE, TEXAS

TREATMENT OF SLUDGE

Application filed December 10, 1928. Serial No. 325,051.

This invention relates to new and useful improvements in the treatment of sludge.

The invention has particularly to do with the treatment of sludge in a settling tank wherein the heavier or more decomposed sludge settles to the bottom and the lighter or less decomposed sludge rises in a gas chamber; and one object of the invention is to elevate the decomposed sludge from the bottom of the tank and mix it with the partially decomposed sludge in the gas chamber so as to hasten the digestion of the latter. This treatment is contrasted with previous treatments wherein fresh sludge or sewage material was brought into intimate contact with decomposed sludge by first settling the fresh sludge and then mixing two grades or qualities of decomposing sludge.

Another object of the invention is to remove floating solids from the settling compartment which, even when degasified, will not sink and introduce such solids into the gas chamber wherein they may be broken up by agitation and mixed with decomposing sludge to effect their digestion.

A further object of the invention is to carry out these operations in a simple manner by means of an intermittent vacuum, whereby the elevated matter is discharged by gravity between the vacuum stages.

The invention will be more readily understood from a reading of the following specification and by reference to the accompanying drawing, in which an example of the invention is shown.

In the drawings I have shown diagrammatically a structure for carrying out the invention and 10 designates the sludge chamber of the purification or settling tank of a sewage disposal plant. The tank has settling compartments 11 on each side of a central gas or scum chamber 12. Septums diverge from each side of the lower end of the gas chamber and separate the settling compartments from the sludge chamber in the usual manner. A drain outlet 14 of a suitable nature is provided in a gas chamber below the scum level. The gas chamber extends above the settling compartments and is suitably closed by a cover 15 through which a gas vent pipe 16 extends. This pipe is connected to a vacuum pump and has connected therein a vacuum regulator 17. The system is operated under a vacuum and this may be regulated, as will hereinafter be described.

A heavy scum, as well as insoluble solids, float on top of the water in the gas chamber. For breaking up this matter so as to release the gas and also to promote digestion, an agitator 18 mounted on the lower end of a rod 19 is shown. The rod is vertically adjustable in a sleeve 20 and has a handle 21, whereby it may be rotated and raised up and down to churn the scum and floating solids. The invention contemplates any suitable agitation and no attempt has been made to go into the details of this feature.

An influent pipe 22 delivers fresh sewage or sludge into each settling compartment or such influent may be introduced in any suitable manner. The sewage settling from the compartments enters the sludge chamber, whereby degasification and digestion takes place. The gases and lighter sludge will rise while the more readily soluble and more easily digested sewage will settle to the bottom of the chamber 10. It is desirous to promote the digestion of the sewage which collects in the gas chamber and hasten its decomposition. There is also an accumulation of floating solids in the settling compartments which will not sink into the sludge chamber.

At one side of the gas chamber 12 a cylindrical barrel or container 23 is mounted. This barrel is connected at its upper end by a pipe 24 with a vacuum pump 25. At the lower end of the barrel an upwardly opening foot valve 26 closes the top of a suction pipe 27 extending through one of the septums 13 to the bottom of the tank 10. A spout 28 extends from the lower portion of the barrel into the gas chamber 12 below the scum level and this spout is closed by a flap valve 29 which is self-closing.

The vacuum pump 25 is operated in stages, thus during each stage heavy digested sludge is drawn up through the pipe 27 past the valve 26 into the barrel 23. As the end of the stage, whereby the vacuum on the barrel is released, the sludge which has been elevated in the barrel above the spout 28 will flow by gravity through said spout, after unseating the valve 29, into the gas chamber and there mix with the lighter and less digested sludge therein. This operation will be repeated during each stage of vacuum and the intermission therebetween.

The two grades of sludge may be mixed and the solids broken up by operating the agitator 18. Where the gas chamber is operated under a vacuum through the pipe 16, the regulator 17 is set so that the vacuum pulled through the pipe 24 will be greater than that operating through the pipe 16. This will tend to keep the valve 29 closed and will assure the lifting of the sludge from the chamber 10.

In the other settling compartment 11 a vertical barrel 30 is mounted and is connected at its upper end with the pump 25 by means of a pipe 31. The barrel 30 has a suction funnel 32 at its bottom extending below the water level in the settling compartment. A foot valve 33 is mounted at the bottom of the barrel and a discharge spout 34 above said valve extends into the gas chamber above the scum level. This spout is closed by a flap valve 35.

During the vacuum stages the insoluble floating solids are drawn into the barrel 30 and during the intermissions these solids are discharged into the gas chamber 12. By suitable agitation the solids are broken up and commingled with the decomposing sludges. It is pointed out that these solids are not fresh sludge or sewage, but are solids which separate from the influent and owing to their buoyancy will not settle out of the settling compartments. Such solids are often degasified and still remain in the settling compartments. By this arrangement the usual skimming operation is avoided.

What I claim, is:

1. The process herein described of promoting the decomposition and digestion of sewage sludge, which consists in settling sludge in a settling tank, maintaining a vacuum over a portion of the sludge so as to remove the gases generated, and elevating the settled digested sludge and mixing it with a portion of the sewage which is under vacuum.

2. The process defined by claim 1, and skimming floating solids from the surface of the liquid and mixing the same with the sewage under vacuum.

3. The process as defined by claim 1, and agitating the mixed sludge to disintegrate the solids and promote digestion.

4. The process as defined by claim 1, also skimming floating solids from a surface of the liquid not under vacuum and mixing the same with the sewage under vacuum, and agitating the mixed sludge.

5. The process herein described of promoting the decomposition and digestion of sewage sludge, which consists in settling sludge in a settling tank, maintaining a partial vacuum over a portion of the sewage so as to remove the gases generated, and intermittently elevating the settled digested sludge and mixing it with the upper portion of the sewage which is under partial vacuum.

6. The process as defined by claim 5, including the utilization of a vacuum for intermittently elevating the digested sludge.

7. The process as defined by claim 5, and agitating the mixed sludge.

8. The process herein described of promoting the decomposition and digestion of sewage sludge, which consists in settling sludge in a settling tank, maintaining a partial vacuum over a portion of the sewage so as to remove the gases generated, intermittently maintaining a vacuum for elevating the settled sludge and mixing it with the upper portion of the sewage which is under partial vacuum, skimming solids from the surface of sewage not under vacuum and mixing the same with the sludge under partial vacuum, and agitating the mixed sludge.

9. The process herein described of promoting the decomposition and digestion of sewage sludge, which consists in settling sludge in a settling tank, maintaining a vacuum over a portion of the sewage to remove gases therefrom, removing floating solids from a portion of the sewage not under vacuum and introducing the same into the sewage under vacuum, and agitating the mixed sewage.

In testimony whereof I affix my signature.

THOMAS B. SIMS.